United States Patent
Gardner

(10) Patent No.: US 12,368,909 B2
(45) Date of Patent: *Jul. 22, 2025

(54) IMAGE ANALYSIS SYSTEM

(71) Applicant: Q Factor Holdings LLC, Scottsdale, AZ (US)

(72) Inventor: Richard Gardner, Scottsdale, AZ (US)

(73) Assignee: Q Factor Holdings LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,777

(22) Filed: Nov. 3, 2023

(65) Prior Publication Data

US 2024/0064348 A1 Feb. 22, 2024

Related U.S. Application Data

(63) Continuation of application No. 17/304,524, filed on Jun. 22, 2021, now Pat. No. 11,849,160.

(51) Int. Cl.
*H04N 21/234* (2011.01)
*G06V 20/40* (2022.01)
(Continued)

(52) U.S. Cl.
CPC ....... *H04N 21/23439* (2013.01); *G06V 20/40* (2022.01); *H04N 21/2393* (2013.01); *H04N 21/44218* (2013.01)

(58) Field of Classification Search
None
See application file for complete search history.

(56) References Cited

U.S. PATENT DOCUMENTS

| | | | |
|---|---|---|---|
| 6,504,990 B1 * | 1/2003 | Abecassis | H04N 7/17318 348/E7.071 |
| 7,620,564 B1 * | 11/2009 | Lippock | G06Q 30/0201 705/7.29 |

(Continued)

FOREIGN PATENT DOCUMENTS

WO  WO-2022272236 A1  12/2022

OTHER PUBLICATIONS

"U.S. Appl. No. 17/304,524, Corrected Notice of Allowability mailed Aug. 16, 2023", 5 pgs.

(Continued)

*Primary Examiner* — An Son P Huynh
(74) *Attorney, Agent, or Firm* — Schwegman Lundberg & Woessner, P.A.

(57) ABSTRACT

A method of using applications of pattern recognition or image analysis is disclosed. A request for a content item is received. A version of the content item is selected from a plurality of versions of the content item based on one or more applications of one or more algorithms. The one or more algorithms include one or more image-analysis algorithms, pattern-recognition algorithms, or genetic algorithms. One or more of the plurality of versions has undergone transformation into a plurality of combinations of content segments that comprise the plurality of versions. The one or more algorithms target one or more success rates with respect to one or more metrics. The selected version of the content item is communicated to the device of the user in response to the request.

18 Claims, 11 Drawing Sheets

(51) Int. Cl.
    *H04N 21/2343*     (2011.01)
    *H04N 21/239*     (2011.01)
    *H04N 21/442*     (2011.01)

(56) References Cited

U.S. PATENT DOCUMENTS

| | | | |
|---|---|---|---|
| 9,264,770 B2* | 2/2016 | Jensen | H04N 21/4756 |
| 9,336,483 B1* | 5/2016 | Abeysooriya | G06N 3/08 |
| 9,392,335 B2* | 7/2016 | Broome | H04N 21/23418 |
| 9,396,761 B2* | 7/2016 | Thomas | G11B 27/007 |
| 9,549,224 B2* | 1/2017 | Jensen | H04N 21/812 |
| 9,565,476 B2* | 2/2017 | Bakke | H04N 21/8456 |
| 9,654,360 B1* | 5/2017 | Kellicker | H04L 43/106 |
| 9,736,503 B1* | 8/2017 | Bakshi | H04N 21/23424 |
| 10,019,255 B1* | 7/2018 | Greenfield | G06F 11/1433 |
| 10,205,988 B1* | 2/2019 | Waterman | H04N 21/8455 |
| 10,257,572 B2* | 4/2019 | Manus | H04N 21/2407 |
| 10,334,328 B1 | 6/2019 | Rosen et al. | |
| 10,390,097 B1* | 8/2019 | Lee | G06Q 50/01 |
| 10,445,762 B1 | 10/2019 | Ho | |
| 10,535,190 B2* | 1/2020 | Logan | H04N 21/6587 |
| 10,645,455 B1* | 5/2020 | Glaeser | H04N 21/4666 |
| 10,681,395 B1* | 6/2020 | Gang | H04N 21/812 |
| 10,708,659 B2* | 7/2020 | Meredith | H04N 21/252 |
| 10,979,778 B2* | 4/2021 | Matthews | H04N 21/44226 |
| 11,158,351 B1* | 10/2021 | Ren | G11B 27/28 |
| 11,206,463 B2* | 12/2021 | Harb | H04N 21/4665 |
| 11,350,157 B2* | 5/2022 | Golyshko | H04N 21/4882 |
| 11,363,316 B1* | 6/2022 | Gang | H04N 21/8541 |
| 11,526,899 B2* | 12/2022 | Ouellet | G06F 18/214 |
| 11,819,764 B2* | 11/2023 | Benedetto | A63F 13/5375 |
| 11,849,160 B2 | 12/2023 | Gardner | |
| 2005/0028194 A1* | 2/2005 | Elenbaas | G06F 16/735 |
| | | | 725/132 |
| 2006/0130119 A1* | 6/2006 | Candelore | H04N 7/163 |
| | | | 725/135 |
| 2007/0154168 A1* | 7/2007 | Cordray | H04N 7/163 |
| | | | 386/230 |
| 2007/0157260 A1* | 7/2007 | Walker | H04N 21/47214 |
| | | | 725/86 |
| 2009/0133051 A1* | 5/2009 | Hildreth | H04N 21/42204 |
| | | | 725/28 |
| 2009/0164904 A1* | 6/2009 | Horowitz | G06F 16/739 |
| | | | 715/723 |
| 2009/0216625 A1* | 8/2009 | Erlebacher | G06Q 10/087 |
| | | | 704/9 |
| 2009/0300699 A1 | 12/2009 | Casagrande et al. | |
| 2010/0251295 A1* | 9/2010 | Amento | H04N 21/485 |
| | | | 725/38 |
| 2011/0069940 A1* | 3/2011 | Shimy | H04N 21/4532 |
| | | | 386/296 |
| 2011/0202562 A1* | 8/2011 | Bloch | G06F 16/745 |
| | | | 707/E17.014 |
| 2012/0124604 A1* | 5/2012 | Small | H04N 21/4223 |
| | | | 725/12 |
| 2012/0278179 A1* | 11/2012 | Campbell | G06Q 30/0255 |
| | | | 705/14.69 |
| 2012/0290399 A1* | 11/2012 | England | G06Q 50/01 |
| | | | 705/14.66 |
| 2012/0324491 A1* | 12/2012 | Bathiche | H04N 21/42201 |
| | | | 725/10 |
| 2013/0031582 A1* | 1/2013 | Tinsman | H04N 21/4316 |
| | | | 725/36 |
| 2013/0205314 A1* | 8/2013 | Ramaswamy | H04H 60/33 |
| | | | 725/14 |
| 2014/0072285 A1 | 3/2014 | Shynar et al. | |
| 2014/0100944 A1* | 4/2014 | Zhu | G06Q 30/0275 |
| | | | 705/14.71 |
| 2014/0289371 A1* | 9/2014 | Moore | H04L 65/65 |
| | | | 709/219 |
| 2015/0033266 A1* | 1/2015 | Klappert | H04N 21/4314 |
| | | | 725/52 |
| 2015/0070516 A1* | 3/2015 | Shoemake | H04N 21/4542 |
| | | | 348/207.11 |
| 2015/0178511 A1* | 6/2015 | Klappert | G06F 21/6245 |
| | | | 726/27 |
| 2015/0181301 A1* | 6/2015 | Bloch | H04N 21/4532 |
| | | | 725/41 |
| 2015/0293675 A1* | 10/2015 | Bloch | G06F 3/04842 |
| | | | 715/723 |
| 2015/0334434 A1* | 11/2015 | Green | H04N 21/2665 |
| | | | 725/34 |
| 2016/0037217 A1* | 2/2016 | Harmon | H04N 21/4542 |
| | | | 725/9 |
| 2016/0050129 A1* | 2/2016 | Hoyne | H04L 43/08 |
| | | | 709/224 |
| 2016/0094875 A1* | 3/2016 | Peterson | H04N 21/4312 |
| | | | 725/41 |
| 2016/0211004 A1* | 7/2016 | Akatiff | G11B 27/031 |
| 2016/0248766 A1* | 8/2016 | Tembey | H04L 63/102 |
| 2016/0253710 A1* | 9/2016 | Publicover | H04W 4/21 |
| | | | 705/14.66 |
| 2016/0267529 A1* | 9/2016 | Jakobsson | G06Q 30/0277 |
| 2017/0053031 A1* | 2/2017 | Dong | G06F 16/955 |
| 2017/0061528 A1* | 3/2017 | Arora | G06Q 30/08 |
| 2017/0085933 A1* | 3/2017 | Czeck, Jr. | H04N 21/812 |
| 2017/0264920 A1* | 9/2017 | Mickelsen | G06V 20/52 |
| 2018/0068019 A1* | 3/2018 | Novikoff | G06F 16/7867 |
| 2018/0225714 A1* | 8/2018 | Lewis | G06Q 30/0261 |
| 2018/0359477 A1 | 12/2018 | Yang | |
| 2018/0376205 A1* | 12/2018 | Oswal | G06T 19/006 |
| 2019/0026274 A1* | 1/2019 | Deng | G06N 3/045 |
| 2019/0052471 A1* | 2/2019 | Panattoni | H04L 67/306 |
| 2019/0109926 A1* | 4/2019 | Hotchkies | H04L 67/01 |
| 2019/0122152 A1* | 4/2019 | McCoy | G06Q 10/06313 |
| 2019/0132639 A1* | 5/2019 | Panchaksharaiah | |
| | | | H04N 21/47217 |
| 2019/0138969 A1* | 5/2019 | Behringer | G06Q 10/06393 |
| 2019/0196421 A1* | 6/2019 | Littlefield | G06Q 10/0639 |
| 2019/0197194 A1* | 6/2019 | Larusson | G06N 20/00 |
| 2019/0230387 A1* | 7/2019 | Gersten | G06F 16/783 |
| 2019/0373330 A1* | 12/2019 | Bloch | H04N 21/4532 |
| 2020/0092610 A1* | 3/2020 | Baughman | H04N 21/42201 |
| 2020/0126100 A1* | 4/2020 | Goyal | H04N 21/812 |
| 2020/0275158 A1* | 8/2020 | Gaur | G06N 3/08 |
| 2020/0288204 A1* | 9/2020 | Duersch | G06F 18/23213 |
| 2020/0310724 A1* | 10/2020 | Aher | G06F 3/1289 |
| 2020/0371940 A1* | 11/2020 | Navon | G06F 12/0868 |
| 2020/0404382 A1* | 12/2020 | Bloch | H04L 65/1069 |
| 2020/0409597 A1* | 12/2020 | Ganesh | G06F 3/0659 |
| 2021/0036921 A1* | 2/2021 | dos Santos Silva | G06N 3/045 |
| 2021/0160571 A1* | 5/2021 | Menendez | G06F 18/2413 |
| 2021/0160572 A1* | 5/2021 | Menendez | G06V 20/41 |
| 2021/0192387 A1* | 6/2021 | Benson | G06N 20/10 |
| 2021/0312318 A1* | 10/2021 | Ambrozic | G06N 3/088 |
| 2021/0365969 A1* | 11/2021 | Lieu | G06Q 30/0201 |
| 2022/0007075 A1* | 1/2022 | Richter | H04N 21/4542 |
| 2022/0370757 A1* | 11/2022 | Altman | G16H 40/67 |
| 2022/0408131 A1 | 12/2022 | Gardner | |

OTHER PUBLICATIONS

"U.S. Appl. No. 17/304,524, Examiner Interview Summary mailed Dec. 15, 2022", 2 pgs.

"U.S. Appl. No. 17/304,524, Examiner Interview Summary mailed Dec. 21, 2021", 2 pgs.

"U.S. Appl. No. 17/304,524, Final Office Action mailed Feb. 23, 2023", 23 pgs.

"U.S. Appl. No. 17/304,524, Final Office Action mailed Feb. 25, 2022", 16 pgs.

"U.S. Appl. No. 17/304,524, Non Final Office Action mailed Sep. 15, 2022".

"U.S. Appl. No. 17/304,524, Non Final Office Action mailed Oct. 5, 2021".

"U.S. Appl. No. 17/304,524, Notice of Allowance mailed Aug. 4, 2023", 10 pgs.

"U.S. Appl. No. 17/304,524, Response filed Jan. 5, 2022 to Non Final Office Action mailed Oct. 5, 2021".

"U.S. Appl. No. 17/304,524, Response filed Jan. 17, 2023 to Non Final Office Action mailed Sep. 15, 2022", 11 pgs.

(56) References Cited

OTHER PUBLICATIONS

"U.S. Appl. No. 17/304,524, Response filed Jul. 24, 2023 to Final Office Action mailed Feb. 23, 2023", 11 pgs.
"U.S. Appl. No. 17/304,524, Response filed Jul. 25, 2022 to Final Office Action mailed Feb. 25, 2022", 13 pgs.
"International Application Serial No. PCT/US2022/073038, International Search Report mailed Oct. 19, 2022", 5 pgs.
"International Application Serial No. PCT/US2022/073038, Response filed Apr. 20, 2023 to Written Opinion mailed Oct. 19, 2022.", 3 pgs.
"International Application Serial No. PCT/US2022/073038, Response filed Aug. 2, 2023 to Written Opinion mailed Jun. 2, 2023", 2 pgs.
"International Application Serial No. PCT/US2022/073038, Written Opinion mailed Jun. 2, 2023", 6 pgs.
"International Application Serial No. PCT/US2022/073038, Written Opinion mailed Oct. 19, 2022", 7 pgs.

\* cited by examiner

900

| M0-0 | C1 | C2 | C3 | C4-1 | C5 | C6 | C7 | C8 |
|------|----|----|----|------|----|----|----|----|
|      | M1 | M2 | M3 | M4-1 | M5 | M6 | M7 | M8 |

| C4-2 |
|------|
| M4-2 |

| C4-3 |
|------|
| M4-3 |

| M0-1 | C1 | C4-2 | C5 | C8 |
|------|----|------|----|----|
|      | M1 | M4-2 | M5 | M8 |

| M0-2 | C1 | C2 | C3 | C4-3 | C5 | C6 | C7 | C8 |
|------|----|----|----|------|----|----|----|----|
|      | M1 | M2 | M3 | M4-3 | M5 | M6 | M7 | M8 |

*FIG. 9C*

IMAGE ANALYSIS SYSTEM

CROSS-REFERENCE TO RELATED APPLICATION

This application is a continuation of U.S. patent application Ser. No. 17/304,524, filed Jun. 22, 2021, which is incorporated by reference herein in its entirety.

TECHNICAL FIELD

The present application relates generally to the technical field of communications applications using image analysis and pattern recognition to enhance or transform digital content items and, in one specific example, to an enhancement or transformation of a sequence of images using applications for automatically identifying, adding, removing, or rearranging identified segments included in the sequence.

BACKGROUND

With massive amounts of digital content being created and made accessible on the Internet, including hundreds of hours of video being uploaded onto various video platforms, such as YouTube, every minute, content creators are often faced with a difficult technical problem of determining how to make their content items stand out in the crowd, particularly with respect to specific performance metrics, such as click-through rate, watch time, or audience retention, that may be important to the content creator or other stakeholders.

BRIEF DESCRIPTION OF THE DRAWINGS

Some embodiments are illustrated by way of example and not limitation in the figures of the accompanying drawings.

FIG. 9A is an example representation of an original content segment corresponding to a content item.

FIG. 9B is an example representation of one of the plurality of possible versions of the content item depicted in FIG. 9A.

FIG. 9C is an example representation of an additional one of the plurality of possible versions of the content item depicted in FIG. 9A

DETAILED DESCRIPTION

Figure 1:
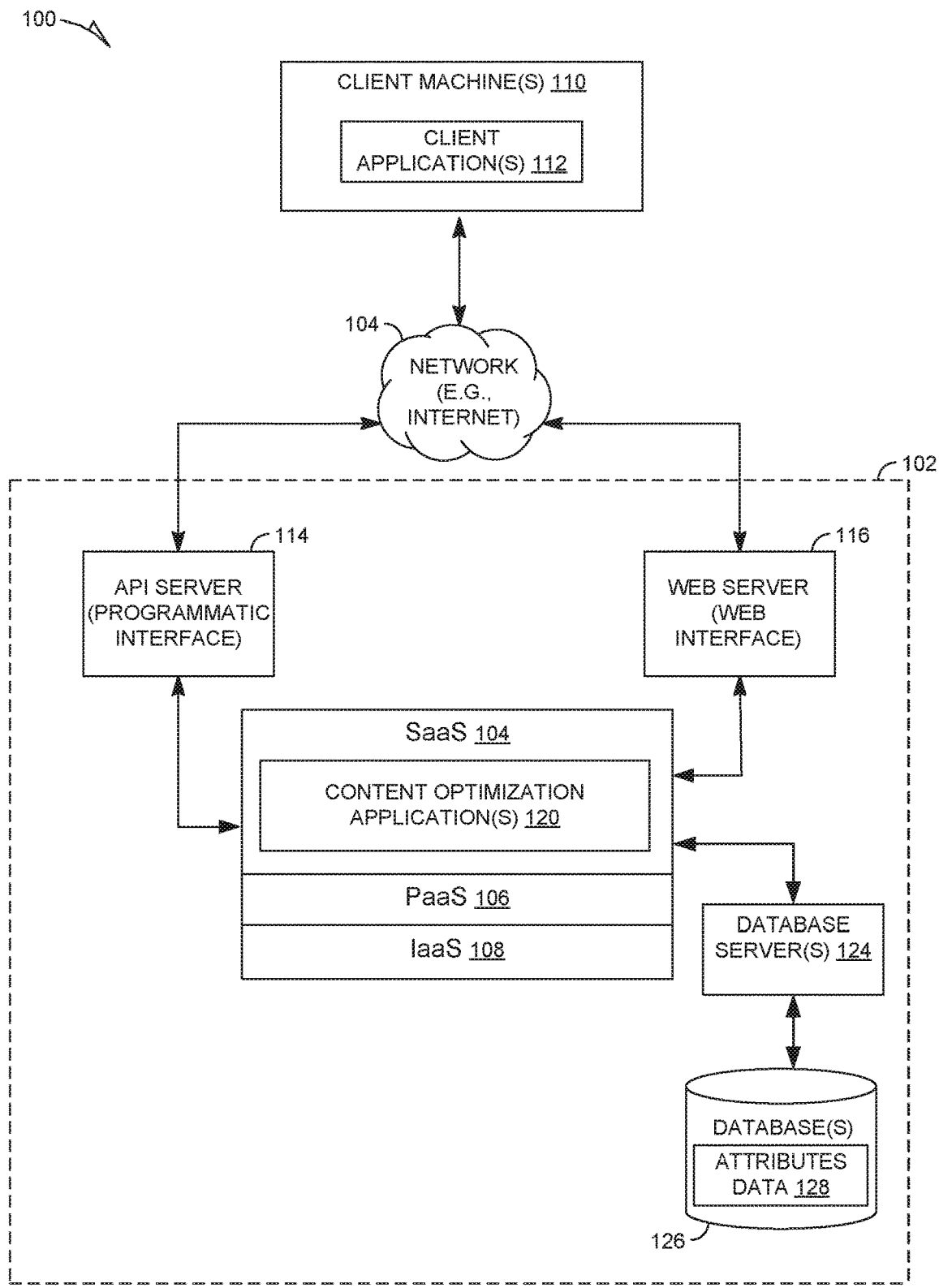
FIG. 1 is a network diagram depicting a cloud-based SaaS system within which various example embodiments may be deployed.

In the following description, for purposes of explanation, numerous specific details are set forth to provide an understanding of various embodiments of the present subject matter. It will be evident, however, to those skilled in the art that various embodiments may be practiced without these specific details.

A content optimization system for content items or data objects of a variety of types is disclosed. The system can be applied to content of various content types, including movies produced by the motion picture industry, content items (e.g., videos, presentations, and documents) produced for education or training, content items (e.g., advertisements) produced for marketing or advertising, or content items (e.g., metadata) produced for search engine optimization. The system can be configured to optimize any of these types of content items for one or more metrics deemed to be important by a creator of the content items or another stakeholder.

In various example embodiments, existing videos are edited in a certain way, or new videos are designed and produced in a certain way, so as to gain maximum benefits from the optimization system. Multiple optimization techniques may be used (e.g., each for a different purpose). Videos may be originally produced in (or existing videos may be cut into) multiple clips or content segments (as few as two, but as many as hundreds or thousands of clips, or more). For example, at least two clips, but as many as hundreds or thousands of clips, or more, may be used to optimize a feature-length movie.

The optimization system generates one or more user interfaces to, for example, allow a video optimization expert to mark up one or more video clips in a video production for optimization. Each clip may be associated with various attributes. The attributes may indicate, for example, whether each of the clips is removable or interchangeable. Or they may indicate an original numerical order for each of the clips (or timestamp/chronological order of the clip in an original content item). This information can be used later by the optimization system to, for example, maintain a proper relative sequence of clips when they are rearranged or otherwise manipulated.

Clips may be identified and selected to allow for a smooth transition from the previous clip to the next clip both before and after optimization. And the attributes assigned to each clip may be based on many factors or aspects of the particular clip in relation to clips that may be placed near it. Attributes may be assigned based on the video script or dialogue (e.g., if there are spoken words), lighting, set, scene, music, sound, and more. In various example embodiments, the attributes are inferred from pattern recognition or image analysis applied to one or more individual images included in the video.

For example, image characteristics (e.g., brightness, contrast, and so on) may be associated with various predetermined or customizable categories of lighting, sets, scenes, and so on. These associations may allow for categorization of each image or sequence of images into one or more of the categories. Additionally, one or more image analysis or pattern recognition algorithms may be applied to determine similarities and/or differences between individual images or sequences of images in one or more frames of images. In various example embodiments, the various types of image analysis and pattern recognition discussed herein may be performed by one or more machine-learned models. For example, a machine-learned model may be trained using one or more training data sets to identify when differences between a first segment of a video (e.g., a subset of the video comprised of a first subset of sequential images of the video) are sufficient to recommend separating the first segment from an additional subsequent segment of the video (e.g., an additional subset of the video comprised of a second subset of sequential images of the video), such that each segment stands alone for purposes of transforming the video (e.g., such that it is optimized for one or more performance metrics). As another example, a machine-learned model may be trained using one or more data sets to identify whether two images or two subsets of images may be connected together in sequence without causing a transition that is too abrupt for a viewer (e.g., based on a value representing a threshold of tolerance of an average viewer). As another example, a machine-learned model may be trained to identify transformations that may be applied to one or more images or sequences of images to make corresponding clips or segments of the video more amenable to either being separated from other segments of the video, combined with other segments of the video, or used interchangeably with other segments of the video. These transformations may then be applied (e.g., in real time) to, for example, allow for more options (e.g., more clips to work with) or more flexibility of the available options (e.g., smoother transitions). Thus, in various example embodiments, the optimization system may transform a video or other content item such that it is optimized for one or more performance metrics by, for example, adding, removing, or interchanging clips based on attributes associated with those clips. In various example embodiments, the video optimization system may simultaneously transform segments or images within the video to ensure individual clips comprising the video are connected substantially seamlessly from the perspective of a viewer (e.g., without any transitions that surpass a transition threshold that is related to the tolerance of an average viewer, as ascertained from monitoring of user behavior or feedback).

Using the disclosed techniques, the optimization system may ensure, for example, that a video that transitions from day to night is not modified in such a way that clips from nighttime are inserted into the timeline when it is supposed to be daytime or vice versa. Or the optimization system video may, for example, ensure that video clips are not inserted from a part of a video that has a different soundtrack, lighting, dialogue, etc. than the clips surrounding it.

Each segment may have one or more attributes that tell the optimization system where each clip may be added, inserted, or removed to, for example, generate different versions of the content item. In some example embodiments, a video optimization expert sets the attributes within a user interface generated by the optimization system. In other example embodiments, one or more machine-learning models may be trained (e.g., based on previous behaviors of the video optimization experts with respect to previous content items) and then applied to automatically set the attributes for a content item or one or more content segments associated with the content item, or at least provide a suggestion to a user of attributes that should be set for one or more content items or one or more content segments.

Each clip may also have an emotion attribute that signifies the perceived or intended feeling associated with the individual clip, such as happy, joyful, excited, sad, angry, disgusted, worried, surprised, fearful, bored, etc. Other example attributes may include importance (e.g., on a scale of 1 to 10), Call to Action (e.g., for marketing videos), Legal Disclaimer, Entertainment, or custom attributes. In various example embodiments, attributes may include keywords or key phrases. Using these attributes, the optimization system may be configured to determine where clips belong, or determine whether the clips can be removed or replaced while optimizing.

Clips may be cut, produced (e.g., captured, edited, composited, or post-produced), or transformed in such a way that transitions occur substantially seamlessly from one clip to the next. For example if a clip uses a music loop, the music may be generated or modified such that it starts at the start of the clip and ends at the end of the clip. Or, if people are talking, the clip may be generated or selected such that is does not cut off the middle of a spoken word. If there is movement in a video, one or more clips may be cut from the video such that the movement comes to a stop at the end of the clips. By producing content segments in this way, the content segments can be edited, removed, or swapped around during post-production.

Multiple clips may be produced specifically to be used as alternative versions anywhere within the content item. For example, the producer may shoot several takes of one segment of the video, each with slight variations in spoken words or actions, or the post production team may, for example, transform the video (e.g., by creating multiple versions of a clip with different color grading or sound effects, for example). The clips may be replaced one or more times (e.g., based on optimization feedback, as discussed in more detail below).

A method of using applications of pattern recognition or image analysis for enhancement or transformation of one or more data objects in a computer graphics communication system is disclosed. A request for a content item is received from a device of a user. A version of the content item is selected from a plurality of versions of the content item. The plurality of versions is generated based on one or more transformations of the content item from a plurality of combinations of content segments that comprise each of the plurality of versions. The transformations are based on one or more predicted success rates of each of the plurality of versions with respect to one or more metrics. The predicted success rates are based on an analysis of one or more attributes corresponding to each of the plurality of combinations of the content segments. A selected version of the content item is communicated to the device of the user in response to the request.

A method of generating and/or selecting a version of a content item that is optimized for one or more metrics is disclosed. A request for the content item is received from a device of a user. A version of the content item is selected from a plurality of versions of the content item. The plurality of versions is generated based on an application of a machine-learned model to a plurality of combinations of content segments that comprise each of the plurality of versions. The machine-learned model is trained to predict success rates of each of the plurality of versions with respect to the one or more metrics. The machine-learned model is configured to receive, as one or more inputs, one or more attributes corresponding to each of combinations of content segments. The selected version of the content item is communicated to the device of the user in response to the request.

A method of using applications of pattern recognition, image analysis, or genetic algorithms for enhancement or transformation of one or more data objects in a computer graphics communication system is disclosed. A request for a content item is received. A version of the content item is selected from a plurality of versions of the content item based on one or more applications of one or more algorithms. The one or more algorithms include one or more image-analysis algorithms, pattern-recognition algorithms, or genetic algorithms. One or more of the plurality of versions has undergone transformation into a plurality of combinations of content segments that comprise the plurality of versions. The one or more algorithms target one or more success rates with respect to one or more metrics. The one or more or more algorithms are configured to receive, as one or more inputs, one or more attributes corresponding to the version. The selected version of the content item is communicated to the device of the user in response to the request.

A method of finding an optimal solution to a content identification problem is disclosed. A request for a content item is received. The request is from a device of a user. A version of the content item is selected from a plurality of versions of the content item based on an application of one or more algorithms. A plurality of combinations of content segments associated with the content item are transformed into the plurality of versions. The one or more algorithms including one or more of image-analysis algorithms, pattern-recognition algorithms, or genetic algorithms. The one or more algorithms target one or more success rates with respect to one or more metrics. The one or more algorithms operating on one or more attributes corresponding to the version. The selected version of the content item is communicated to the device of the user in response to the request.

The present disclosure includes apparatuses that perform one or more operations or one or more combinations of operations described herein, including data processing systems and computer readable media, which, when executed on the data processing systems cause the systems to perform these operations. These operations include non-routine and unconventional operations, when executed individually or in combination, as described in more detail below.

FIG. 1 is a network diagram depicting a system 100 within which various example embodiments may be deployed. A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). FIG. 1 illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Each of the client application(s) 112 may include a software application module (e.g., a plug-in, add-in, or macro) that adds a specific service or feature to the application.

An Application Programming Interface (API) server 114 and a web server 116 are coupled to, and provide programmatic and web interfaces respectively to, one or more software services, which may be hosted on a software-as-a-service (SaaS) layer or platform 104, The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications 120 are shown in FIG. 1 to form part of the networked system 102, in alternative embodiments, the applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 and so as to allow the server applications 120 to share and access common data. The server applications 120 may furthermore access one or more databases 126 via the database servers 124. In various example embodiments, various data items are stored in the database(s) 126, such as content segment attributes data items 128.

Navigation of the networked system 102 may be facilitated by one or more navigation applications. For example, a search application (as an example of a navigation application) may enable keyword searches of data items included in the one or more database(s) 126 associated with the networked system 102. A browser application may allow users to browse data structures according data items that are classified into information silos as content segment attributes data items 128. Various other navigation applications may be provided to supplement the search and browsing applications.

Figure 2:
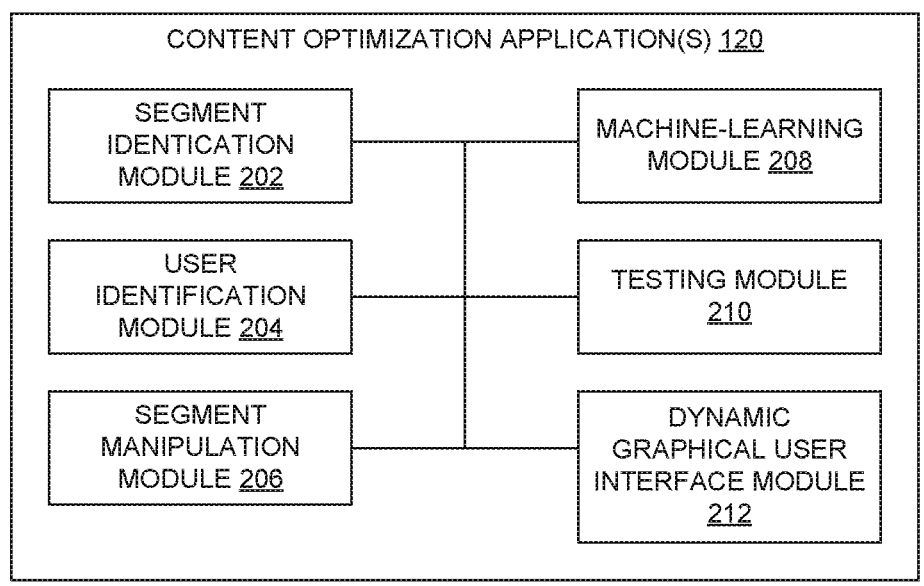
FIG. 2 is a block diagram illustrating example modules of the synchronization applications of FIG. 1.

FIG. 2 is a block diagram illustrating example modules of the content optimization service(s) 120. A segment identification module 202 is configured to identify content segments associated with a content item, such as a video or text content item, as described in more detail below. A user identification module 204 is configured to identify a user associated with the request, as described in more detail below. A segment manipulation module 206 is configured to generate a plurality of versions of a content item from content segments associated with the content item, including by adding, removing, or reordering content segments to produce different versions of the content item, each comprising different combinations of content segments, as described in more detail below. A machine-learning module 208 is configured to train and apply one or more machine-learned models to, for example, identify segments within a content item or generate new versions of a content item, as described in more detail below. A testing module 210 may be configured to compare performances of a plurality of versions of a content item with respect to one or more performance metrics, such as click-through rate, watch time, or audience retention, number of interactions (e.g., total "likes" or "likes" within a time frame, or rates of other social interactions), and so on, as described in more detail below. A dynamic graphical user interface module may be configured to generate one or more user interfaces to, for example, enable a video optimization expert identify content segments within a content item or add attributes to a content item or content segment; enable a video producer to produce variations for content segments; allow a postproduction expert to add background music, color grading, etc. to a content item or content segment; allow a user to give feedback on a content item or content segment, and so on, as described in more detail below. In various example embodiments, one or more machine-learned models may be trained using one or more training data sets (e.g., based on monitoring of user behavior with respect to the user interfaces) to automatically transform (e.g., in real time) one or more segments or clips of a video using any of the post-production techniques described herein. Thus, for example, the number of available clips may be increased (e.g., based on identification of additional clips) or the available clips may be modified such that they are more compatible with one another (e.g., for being combined in a particular sequence or being used as alternatives to one another).

Figure 3:
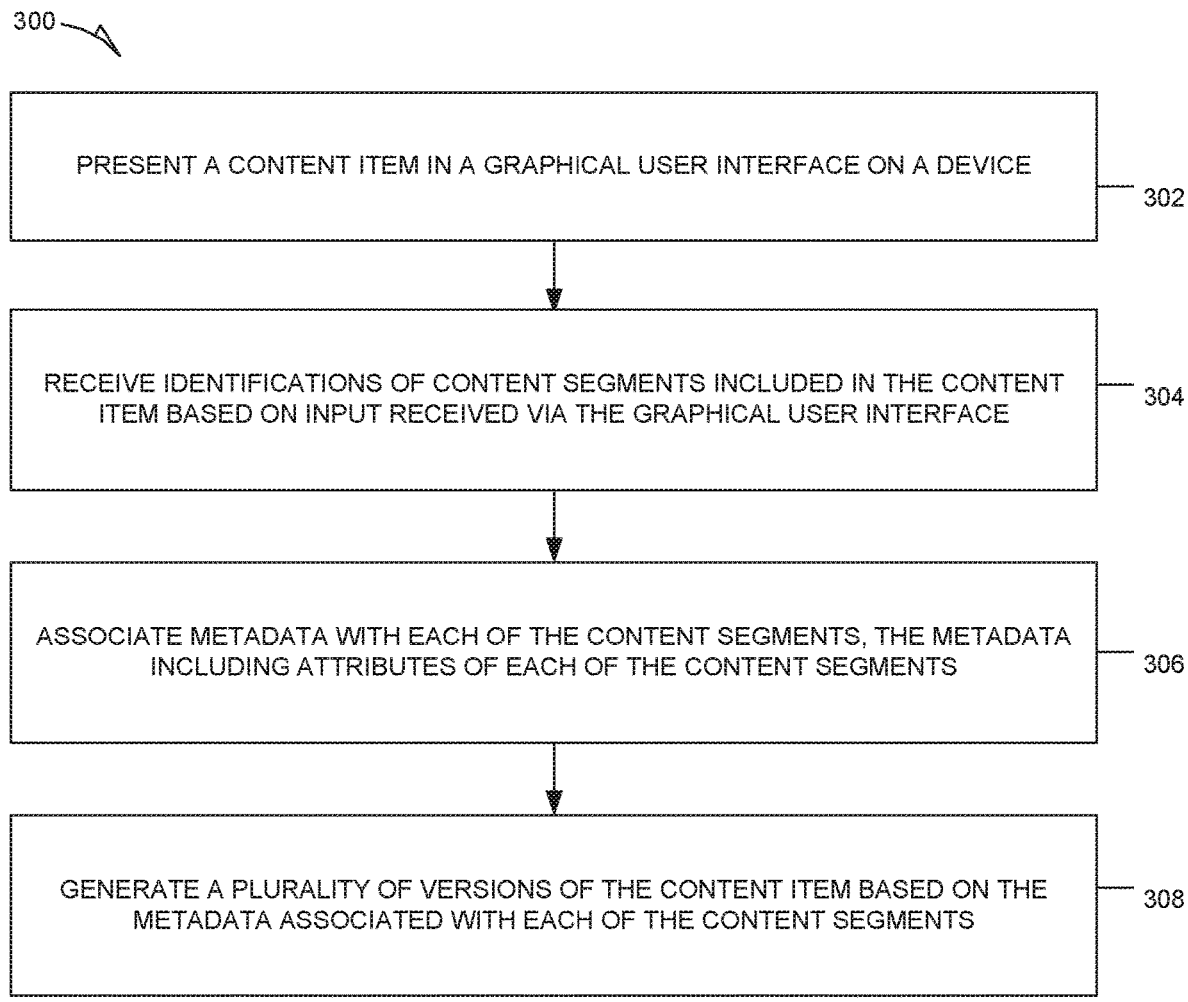
FIG. 3 is a flowchart illustrating example operations of a method of generating a plurality of versions of a content item.

FIG. 3 is a flowchart illustrating example operations of a method 300 of generating a plurality of versions of a content item (e.g., for purposes of optimizing the content item based on one or more metrics). In various example embodiments, the method 300 is performed by one or more of the modules of FIG.

At operation 302, a content item and/or one or more segments corresponding to a content item are presented in a graphical user interface (e.g., on a device of a user, such as a video optimization expert).

In various example embodiments, one or more segments associated with the content item may have been recorded and/or produced individually, so no cutting may be necessary for those segments. In various example embodiments, additional segments within the content item or within one or more segments of the content item may be identified based on a detection of one or more indicators, such as a tone marker or a slate (e.g., made by a clapper board) that is used by directors to mark or "slate" new scenes when shooting a video. In various example embodiments, such markers may be depicted within the graphical user interface (e.g., in a visual representation of an audio track presented on a timeline associated with the content item).

In various example embodiments, clips may be automatically cut based on a threshold associated with the marker being surpassed, the threshold being configurable via the user interface by the user. For example, for an audio marker, the user may specify a decibel threshold or percentage of loudness relative to the average audio level in the video clip at which the content item or content segment is to be automatically cut. In various example embodiments, predetermined default values may be provided for the threshold value, such as 12 decibels or 80% loudness, which may be modified by the user via the user interface.

In various example embodiments, one or more additional segments within the content item or within segments of the content item may be identified based one or more additional indicators, including indicators identified by a machine-learned model, such as a convolutional neural network for image recognition. For example, such factors may include identifying areas of silence or near-silence relative to the average audio sound level in the video, areas of image transition, such as transitions indicative of new scenes, and so on. Locations within the content item or the one or more segments corresponding to the learned indicators may be identified in the user interface and presented for optional cutting of the content item or the one or more segments into one or more additional segments. Input via the interface may then be fed back into the machine-learned model to improve the accuracy of the model with respect to identifications of locations at which a content item or segment may be cut.

In various example embodiments, cut locations may be identified based on various constraints, such as a minimum length or maximum length for a cut segment. These constraints may be configured by the user via the user interface. For example, if a user specifies a 30 second minimum cut length, a cut may not be suggested until at least 30 seconds after the last cut, even if a marker or other indicator is identified within those 30 seconds. Similarly, if a user specifies a maximum cut length of 2 minutes and 30 seconds, a cut may be suggested before the 2 minutes and 30 seconds has elapsed since the last cut, even if no markers or other indicators are identified in those 2 minutes and 30 seconds.

In various example embodiments, a visual representation of the end of the segment just prior to the suggested cut and a visual representation of the start of the segment just after the suggested cut will be presented within the user interface. Additionally, the user may be prompted to accept or cancel the suggested clip. In various example embodiments, multiple visual representations and cuts will be suggests simultaneously within the user interface, enabling the user to easily pick and choose one or more of the suggested cuts via the user interface.

At operation 304, an indication of content segments included in the content item are received via the graphical user interface. For example, the video optimization expert may use controls provided by the user interface to indicate where each content segment in a video content item starts and ends.

At operation 306, metadata is associated with each of the content segments. In various example embodiments, at least some of the metadata is determined automatically, such as the original position of each content segment within an original version of the content item, identification of audio tracks (e.g., music or voice overs) that are associate with the content item, a timestamp associated with the content item, and so on. In various example embodiments, some of the metadata is set manually (e.g., by a video optimization expert) via the user interface. For example, the video optimization expert may specify attributes for each content segment that indicate whether the content segment is removable/severable from the content item, movable to another position within the content item (and, if so, which positions), should remain at a fixed position in the content item (e.g., at the beginning or end of the content item), should remain at a certain position relative to one or more other content segments associated with the content item, or is interchangeable with one or more other content segments associated with the content item.

In various example embodiments, a machine-learning model may be trained based on behavior of the video optimization expert with respect to various content items processed by the video optimization expert. Then the machine-learning model may be applied to automatically set attributes for content segments (e.g., when a certain prediction accuracy threshold is reached). In various example embodiments, the user interface may prompt the user to verify that the machine-learned model has correctly applied the attributes the content segment and may adjust itself (e.g., based on a new training data set that includes input from the video optimization expert as to whether various attributes were set correctly by the model).

At operation 308, a plurality of versions of the content item are generated based on the metadata associated with each of the content segments. For example, assuming there are sufficient computing resources available to the optimization system, all of the possible versions of the content item may be generated. Each of these versions includes a different combination of content segments and complies with any requirements set forth in the metadata, such as in the attributes discussed above.

If there are not sufficient computing resources, or if a constraint is applied with respect to, for example, the amount of computing resources that may be used or the number of versions that may be generated, the versions may be prioritized based on a prediction of their success rates with respect to one or more metrics. The prediction of the success rates may be based on an application of a machine-learned model to each of the versions of the content item, including attributes associated with each content segment included in each version. Then the versions have of the content item having the lower predicted success rates may be thrown out such that any specified constraint is not violated. In various example embodiments, the machine-learned model may be trained based on various inputs, including user behavior data, as explained in more detail below.

In various example embodiments, one or more global constraints may be applied with respect to the content item as a whole. For example, a global constraint may specify a minimum or maximum length of the content item. In this case, the optimization system may select just the combinations of content segments for each version that satisfy the one or more global constraints.

Figure 4:
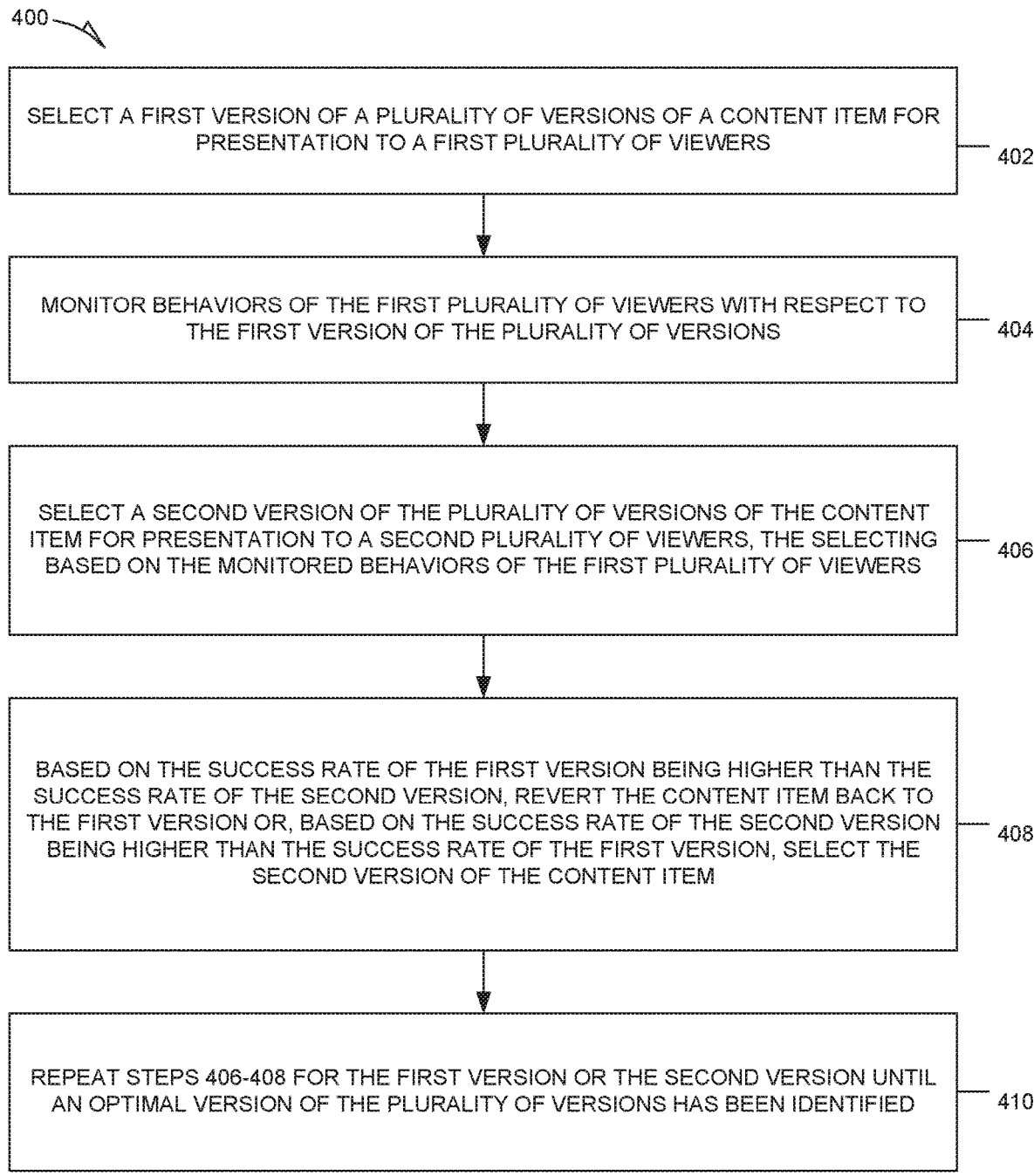
FIG. 4 is a flowchart illustrating example operations of a method of optimizing a content item for one or more metrics based on monitored user behavior and success rates.

FIG. 4 is a flowchart illustrating example operations of a method 400 of optimizing a content item for one or more metrics based on monitored user behavior and success rates. In various example embodiments, the method 400 is performed by one or more of the modules of FIG. 2.

In various example embodiments, there may be hundreds or thousands of possible variations for even a very short video of only a few minutes, and tens to hundreds of thousands of variations for feature-length movies. In these cases, brute force optimization (e.g., A/B testing of every possible combination) would be impractical. Instead, a more efficient optimization technique is required. In various example embodiments, the goal of the optimization system is to find an optimal combination of clips that have the best success rate with respect to one or more metrics—e.g., that together constitute the most likeable, enjoyable, or comprehendible content item and to do so in the shortest amount of iterations (e.g., by means of iterative optimization, such as through one more applications of a genetic algorithm).

At operation 402, a first version of a plurality of versions is generated and/or selected for presentation to a first plurality of users. For example, one of the plurality of versions generated using the technique discussed in FIG. 3 may be selected. In some example embodiments, the first version may be selected randomly. In other example embodiments, the first version may be selected based on weightings assigned to the plurality of versions. In various example embodiments, the weightings may be generated based on a predicted success rate with respect to the one or more metrics, as discussed above. Then the first version may be selected based on an ordered ranking of the plurality of the versions (e.g., from highest to lowest ranking).

At operation 404, behaviors of the first plurality of viewers are monitored with respect to the first version of the plurality of versions. When the count of the first plurality of viewers reaches a threshold count (e.g., a statistically-significant number of viewers), the success rate of the first version with respect to one or more metrics may be determined.

At operation 405, a second version of the plurality of versions of the content item is selected for presentation to a second plurality of users. In various example embodiments, the selection of the second version will be based on the monitored behavior of the first plurality of users with respect to the first version. For example, specific meanings may be extrapolated from the behaviors of the first plurality of users with respect to the first version. For example, based on a user scrubbing backwards or rewinding the first version of the content item at a specific point in time, the location within the first version of the content item timeline where the viewer repositioned the timeline to may be inferred as indicating that the content segment at that specific moment in the first version of the content item is unclear or confusing, which may indicate that the clip should be replaced or removed, or that another clip should be inserted before or after it. Or, as another example, based on a viewer scrubbing forward or fast-forwarding the first version of the content item, it may be inferred that the specific part of the video that is passed by is boring or confusing, and that particular clip within the video may need to be replaced or removed.

Additionally, the timing in the video when the user presses a "thumbs up" or "thumbs down" or like/dislike button, or a "subscribe" button, may indicate a personal feeling about the clip where the timeline is at during the time of the action. That is to say, if a viewer presses dislike at 00:15, where clip 3 is playing, it may indicate that the user disliked the clip, in addition to, or rather than, the entire video, which may suggest that the particular clip needs to be replaced or removed.

Note that the optimization target may also be based on actions that viewers take after watching a video, such as clicking a link, signing up for a newsletter, purchasing products, etc.—in fact one or more clips may have a Call To Action link or written or spoken message, and the location of that Call To Action within the video may be optimized using this system, just for example.

Additionally, a questionnaire may display during or after the video for certain (or for all) users, asking such questions as "How did this video make you feel? Did it make you feel sad, happy, joyful, angry, curious, surprised, amazed, disgusted, depressed, stressed, angry," etc. The video optimization target may be based on one or more of the available choices. For example, a political candidate may wish to optimize a political ad to make viewers angry about a political opponent. Video clips that contain attributes signifying emotions may be added or removed and the video may be modified and tested again and again until the desired effect is optimized with respect to one or more metrics, such as those pertaining to how the content item made the user feel.

In various example embodiments, chat room text, such as a chat involving one or more users that occurs simultaneously with the presentation of the content item, may be analyzed (e.g., to identify sentiments of the one or more users with respect to the portion of the content item that is being presented). In various example embodiments, the analysis of the chat may be indicative of interest in the one or more users in the portion of the video. In various example embodiments, sentiment analysis may be performed using natural language processing, text analysis, and/or computational linguistics to determine the overall tone and mood of the text. The words used may be analyzed for a sentiment pertaining to the portion of the content item being presented when the words were used and/or sentiment pertaining to the content item as a whole. The content item may then be optimized with increase interest levels and/or particular desired sentiments, such as positive sentiments or negative sentiments.

Moreover, a keyword and key phrase suggestion feature may be used. If this feature is used, and if at least one content segment contains keyword or key, phrase tags, and if the metadata specifies that a minimum number of certain keywords and key phrases are to be included in each optimized content item, the system is configured to ensure that. For example if a video clip is suggested to be removed from a video by the system, and if that video clip contained a certain keyword or key phrase, and if by removing that clip, the minimum keyword or key, phrase policy would be violated, then the clip would not be removed.

In various example embodiments, keyword and key phrase suggestions may be generated for associating with each content segment or with content items as a whole (e.g., using Natural Language Understanding (NLU)).

The keyword and key phrase suggestion feature of the program may accept any number of starter keywords and key phrases (e.g., such as the words included in script or words included in metadata associated with a content item or segment).

In various example embodiments, stop words may be removed. In various example embodiments, these stop words include a set of commonly used words in any language, such as "the," "if," "and," "or," and so on.

Next, the remaining words may be stemmed and uniquely sorted by their frequency.

Next, suggested keywords and key phrases that are related to the stemmed words and key phrases may be identified. For example, large volumes of related text may be analyzed, such as through searching of Wikipedia, conducting of Internet searches, or crawling of the Internet, to find related keywords and key phrases.

For example, a Google search may be conducted using the stemmed words and the results may be scanned for new words and phrases. A total frequency of each keyword may be aggregated from one or more such sources.

A word embedding algorithm, such as one used by search engines to contextual information, may be used to map the newly found keywords and phrases.

In various example embodiments, the cosine distance is calculated between the newly discovered keywords and key phrases found in the retrieve source documents. In various example embodiments, only those words and phrases that relate to the original entity or subject in question are marked for use as newly suggested keywords and key phrases.

Once suggested keywords and key phrases have been identified, the frequency and location of the keywords may be suggested for inclusion in various video scripts (e.g., based on the video optimization expert's settings). After video production is complete, video clips may be tagged with keywords and key phrase tags, and during optimization a minimum number of the key words and key phrases will be maintained in each video after optimization.

In various example embodiments, the text may be analyzed for overall sentiment (e.g., positive or negative). Additionally, certain negative words in the script may be flagged. Flagged words may be analyzed for subsequent deletion (e.g., increase the overall sentiment) either automatically (e.g., through application of a machine-learned model) or with input from an administrator via a user interface.

In various example embodiments, the text may be compared to a database of words, including stemmed words and synonyms, that correspond to words that search engines (e.g., Google) do not like (e.g., that the search engines use to demote a content item in search rankings). Examples of such words may include scam, rip-off, refund, virus, spyware, bitcoin, cryptocurrency, nude, porn, and so on. Such problematic words may be reworded automatically or flagged for subsequent rewording or deletion (e.g., through application of a machine learned model or with input from an administrator via a user interface). Thus, the text may be optimized for these search engines.

These measurements of user behavior and/or inferences made from these measurements, as well as keyword and key phrase selections, may be recorded in a database or file system on one or more servers, and used by the optimization system to create the next iteration of the video (e.g., to replace the existing video). This may occur at set intervals in time (hourly, daily, weekly) and/or based on the number of views, the percentage of positive vs. negative actions (e.g., when negative interaction percentage reaches a predetermined, configurable threshold), and so on.

For example, rather than randomly selecting the second version of the content item, the second version may be selected in a "smart" way (e.g., based on the second version including one or more alternative content segments for the segments in the first version that were inferred as being potentially problematic or having less value in view of the behaviors of the first plurality of users with respect to the first version of the content item and/or based on the second version preserving content segments in the first version that were inferred to have more value and/or based on a matching of suggested keywords and key phrases between the content items or the content segments within the content items). In various example embodiments, this smart selection may be used alone or further combined with the predicted success rankings of the plurality of versions of the content item; for example, the highest ranked version that replaces at least one of the problematic segments in the first version may be selected. In various example embodiments, the plurality of versions may be reranked based on one or more of their predicted success rates, as discussed above, in combination with generated "value" scores (positive or negative), which represent the value of each content segment and may help identify potential for each of the other plurality of versions to increase the value of content item (e.g., by rectifying issues inferred from the behavior of the first plurality of users with respect to the first version and predicted success rates or by preserving relatively valuable content segments). Furthermore, this smart selection may be based on any constraints associated with each content segment or the content item as a whole that comprises the content segments.

In various example embodiments, user behavior, including feedback (e.g., if it exists) from previous versions (e.g., if they exist) of the video for each iteration. For example, if Clip #8 has a high drop-off rate, or high scrub-through rate, then that Clip's fitness will be decreased, so that it will become less likely to be used in future versions of the video during optimization.

In various example embodiments, each clip will have a score or weight that gets adjusted during optimization. So, once the video has been fully optimized (e.g., for one or more metrics, a particular time frame, and/or a particular environment), a report may be generated that provides useful insights. For example, if 75% of all viewers dropped off when they watched Clip #8, which may discuss product pricing for example, then a determination could be made that the product is too expensive.

At operation 408, behaviors of the second plurality of viewers are monitored with respect to the second version of the plurality of versions. When the count of the second plurality of viewers reaches a threshold count (e.g., a statistically-significant number of viewers), the success rate of the second version with respect to one or more metrics may be determined.

The success rate of the first version is then compared with the success rate of the second version with respect to the one or more metrics. Based on a determination that the second version is less successful than the first version, the content item may be reverted back to the first version for subsequent processing of the content item. Otherwise, based on a determination that the second version is at least as successful as the first version, the second version may be selected for subsequent processing of the content item.

At operation 410, steps 406-408 are repeated for the version that is selected for subsequent processing in operation 408. Thus, for example, if the second version is selected for subsequent processing, a third version of the plurality of versions is selected for comparing with the second version (e.g., based on predicted success rates and/or value scores determined from the behaviors of the second plurality of users with respect to the second version). Or, if the first version is selected for subsequent processing, the third version is selected for comparing with the first version (e.g., based on predicted success rates and/or value scores determined from the behaviors of the first plurality of users with respect to the first version). In various example embodiments, this iterative process may continue until all or a threshold number of versions of the plurality of versions have been analyzed. In various example embodiments, the version selected at the end of the processing is identified as the optimal version with respect to the one or more metrics. Nevertheless, this iterative optimization technique may be continually repeated (e.g., to account for staleness of particular content segments over time or a changing viewer demographic, the addition of new content segments associated with the content item, or the removal of content segments associated with the content item.). The technique may even be performed in real-time as such changes occur to ensure that the content item is optimized for a current set of conditions within a particular time frame.

In various example embodiments, the operations of the method of FIG. 4 comprise a genetic algorithm in which the "fittest" version of the content item is selected after each generation or cycle and an "offspring" of the fittest version is used in the next generation or cycle. In various example embodiments, an initial population may be comprised of "genes" that correspond to metadata or attributes associated with content segments associated with the content item. These genes may be joined or encoded into a "chromosome" comprising a plurality of combinations or permutations of the genes. In various example embodiments, each candidate solution (also referred to as an individual, creature, or phenotype) may be represented as an array of bits or other type or as a similar data structure.

In various example embodiments, a fitness function determines how fit an individual is (e.g., the ability of the individual to compete with other individuals). In various example embodiments, the fitness function pertains to one or more of the performance metrics described herein. In various example embodiments, the probability that an individual will be selected for reproduction is based on its fitness score. In various example embodiments, each individual is of a fixed size (e.g., to facilitate crossover operations, as described below). In other embodiments, variable length representations and one or more tree-like representations, graph-form representations, or mix of both linear chromosomes and trees may be used. In various example embodiments, a fitness function value of an individual may be determined from simulations (e.g. in real time) with respect to the one or more performance metrics selected for the optimization.

In various example embodiments, one or more pairs of individuals (parents) are generated (e.g., randomly) or selected from a set of predetermined or randomly-generated individuals (e.g., based on fitness scores). In various example embodiments, the initial population may be seeded based on an assessment of where optimal solutions are likely to be found. For each pair of parents to be mated, a crossover (or recombination) point may be chosen (e.g., at random) from within the genes. Offspring are created by exchanging the genes of parents among themselves until the crossover point is reached. The new offspring are then added to the population as a new generation).

In various example embodiments, in certain new offspring formed, some of their genes are subjected to mutation (e.g., with a lower random probability). Mutation may help to maintain diversity within the population and prevent premature convergence.

In various example embodiments, the fitness of each of the offspring of a generation are evaluated with the fitness function.

In various example embodiments, the algorithm terminates if the population has converged (e.g., it does not produce offspring that are significantly different from the previous generation), a configurable maximum number of generations has been produced, or a configurable satisfactory fitness level has been reached for the population.

In various example embodiments, the population may have a fixed size. As new generations are formed, individuals with least fitness die, providing space for new offspring.

In various example embodiments, the sequence is repeated with a goal to produce individuals in each new generation that are better than in the previous generation.

For example, in example embodiments, one or more pairs of each successive generation are selected to breed a new generation, such as randomly or through a selection method that gives a higher weight to fitter solutions.

In example embodiments, the problem may be solved simultaneously using multiple different starting populations and optimal solutions identified from each starting point may be compared. If they do not converge, additional starting points may be used in an attempt to find a convergence. If no convergence is identified, a best solution from each of the convergences from each of the initial starting points may be selected as the optimal solution.

Figure 5:
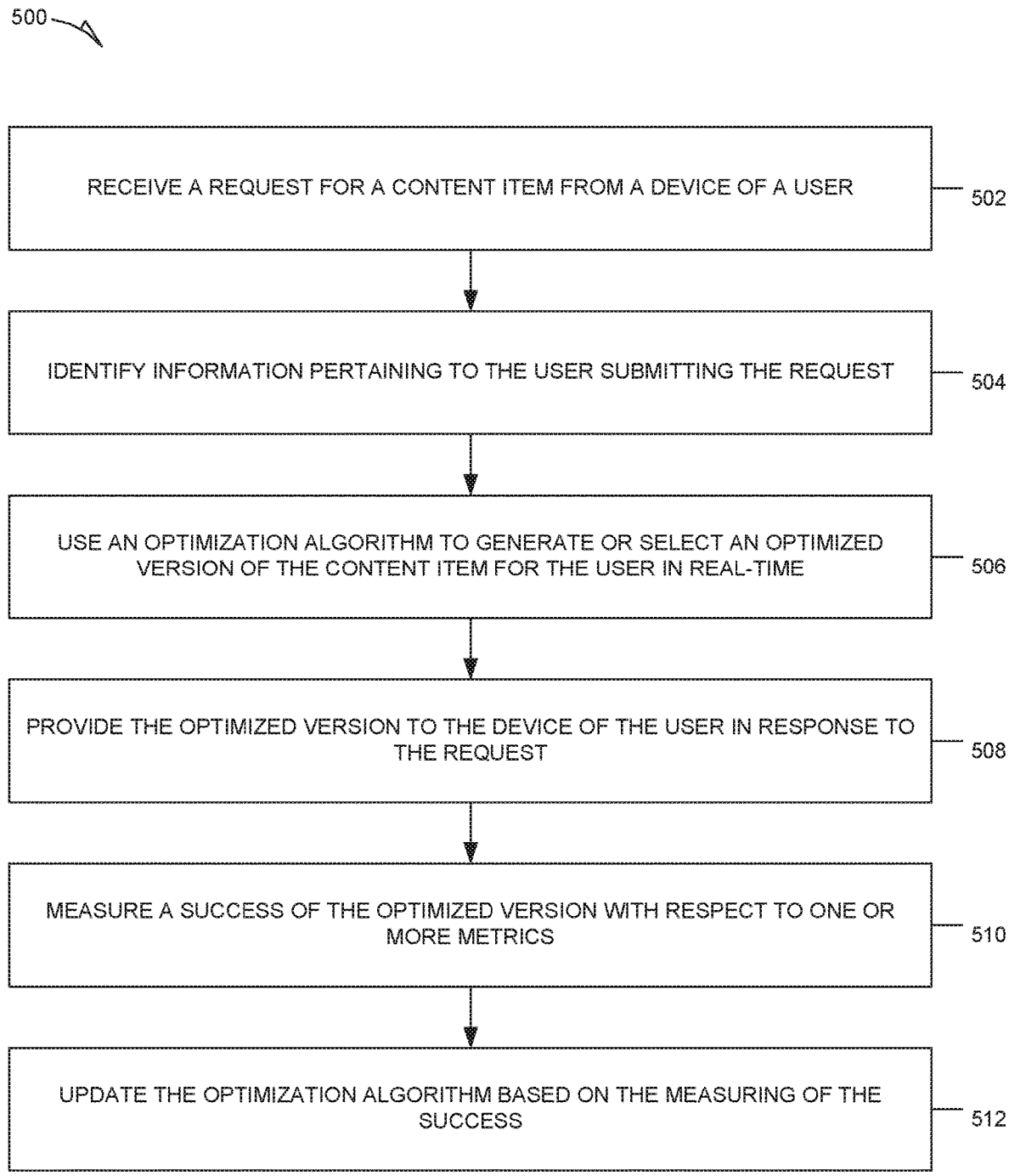
FIG. 5 is a flowchart illustrating example operations of a method of generating an optimized content item for a particular user (e.g., in real time).

FIG. 5 is a flowchart illustrating example operations of a method 500 of generating an optimized content item for a particular user (e.g., in real time). In various example embodiments, the method 500 is performed by one or more of the modules of FIG. 2.

At operation 502, a request for a content item is received from a device of the user.

At operation 504, information pertaining to the user is identified. In various example embodiments, this information may be derived from a profile of the user or metadata (e.g., location data, device data, and so on) associated with the request received from the user.

At operation 506, an optimization algorithm, such as a machine-learned model, is applied to a plurality of content segments to generate a content item that is optimized for the user (e.g., in real time) with respect to one or more metrics. For example, a feature vector that includes the information pertaining to the user may be provided to the machine-learned model. The machine-learned model may then output an ordered combination of content segments selected from a plurality of content segments associated with the content item, wherein the ordered combination is predicted to have the highest success rate with respect to both the one or more metrics and information pertaining to the specific user. This machine-learned model may have been previously trained to identify optimal versions of the content item for the one or more metrics using training data sets that include feature vectors corresponding to other users and corresponding success rates of the selected versions of the content item.

At operation 508, the optimized version of the content item for the specific user is provided to the device of the user in response to the request.

At operation 510, a success of the optimized version with respect to the one or more metrics is measured.

At operation 512, the optimization algorithm is updated (e.g., in real time) based on the measuring of the success. The updated algorithm may then be used in subsequent processing of subsequent requests for the content item from additional users.

Figure 6:
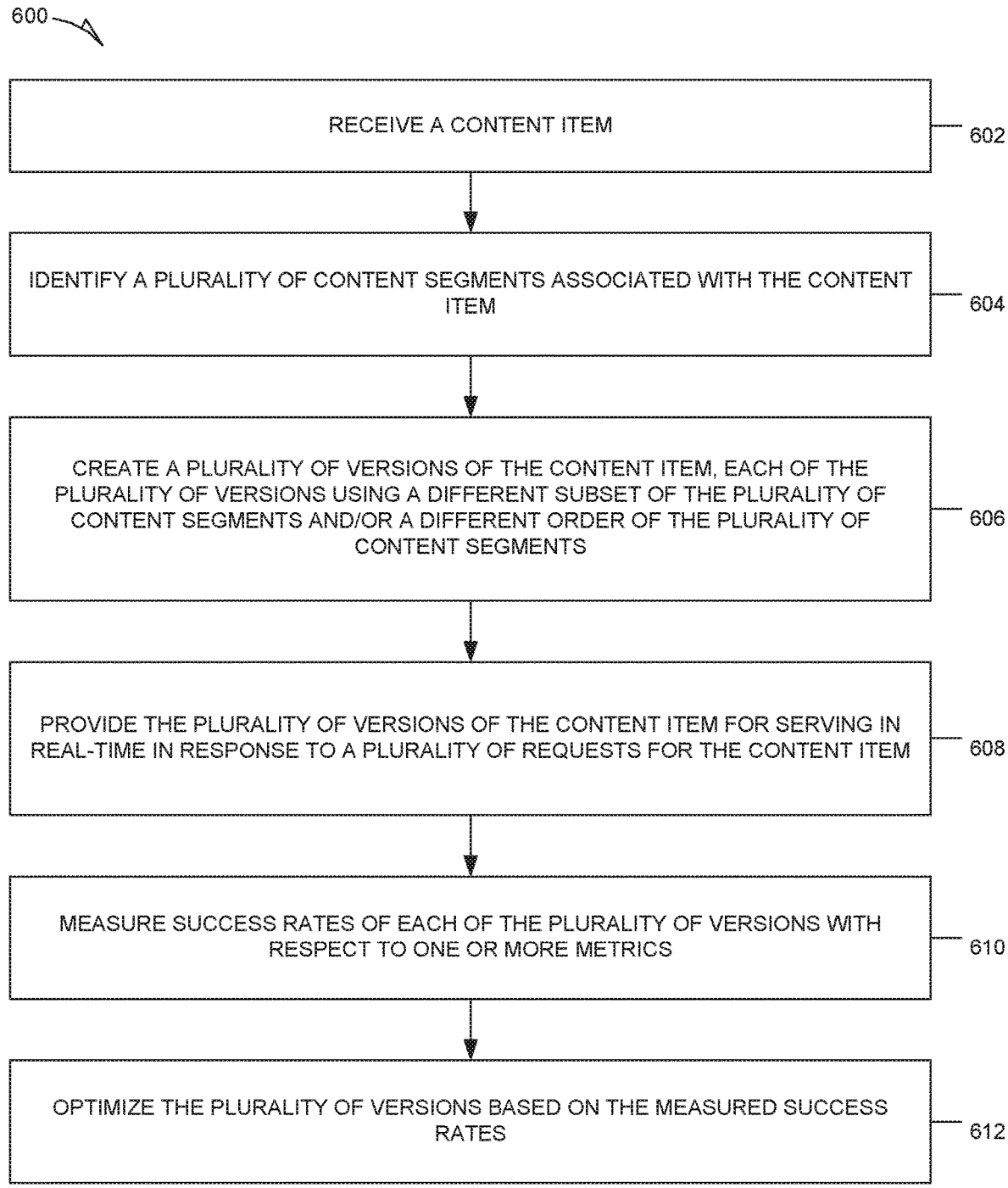
FIG. 6 is a flowchart illustrating example operations of a method of optimizing a plurality of versions of a content item based on measured success rates with respect to one or more metrics.

FIG. 6 is a flowchart illustrating example operations of a method 600 of optimizing a plurality of versions of a content item based on measured success rates with respect to one or more metrics. In various example embodiments, the method 600 is performed by one or more of the modules of FIG. 2.

At operation 602, a content item is received.

At operation 604, a plurality of content segments associated with the content item are identified. In various example embodiments, these content segments may be identified by one or more machine-learned algorithms and/or via inputs received via a user interface, as discussed above. In various example embodiments, the content segments include one or more segments that may be used as alternatives to one another, one or more segments that are interchangeable with one another, one or more segments that are removable, and so on. Such attributes of each content segment may be specified as attributes (e.g., within metadata associated with each content segment and/or the content item as a whole), as discussed above.

At operation 606, a plurality of versions of the content item may be created. In various example embodiments, each of the plurality of versions of the content item uses a different subset of the plurality of content segments and/or a different order of the plurality of content segments. In various example embodiments, all possible subsets in view of the attributes of the segments and/or any constraints are created, as discussed above. In alternative embodiments, only those subsets having at least a threshold predicted success rate with respect to one or more metrics and/or information pertaining to a requesting users are created.

At operation 608, the plurality of versions of the content item are provided for serving in real-time in response to a plurality of requests for the content item.

At operation 610, success rates pertaining to the serving of each of the plurality of versions are measured with respect to the one or more metrics.

At operation 612, the plurality of versions is optimized based on the measure success rates. For example, versions falling below a certain predetermined or configurable threshold success rate may be removed from the plurality of versions. Versions having statistically higher success rates may be giving higher weight for subsequent use. In various example embodiments, the versions may be continually optimized until the version having the highest rating for a particular environment and time frame is discovered.

Figure 7:
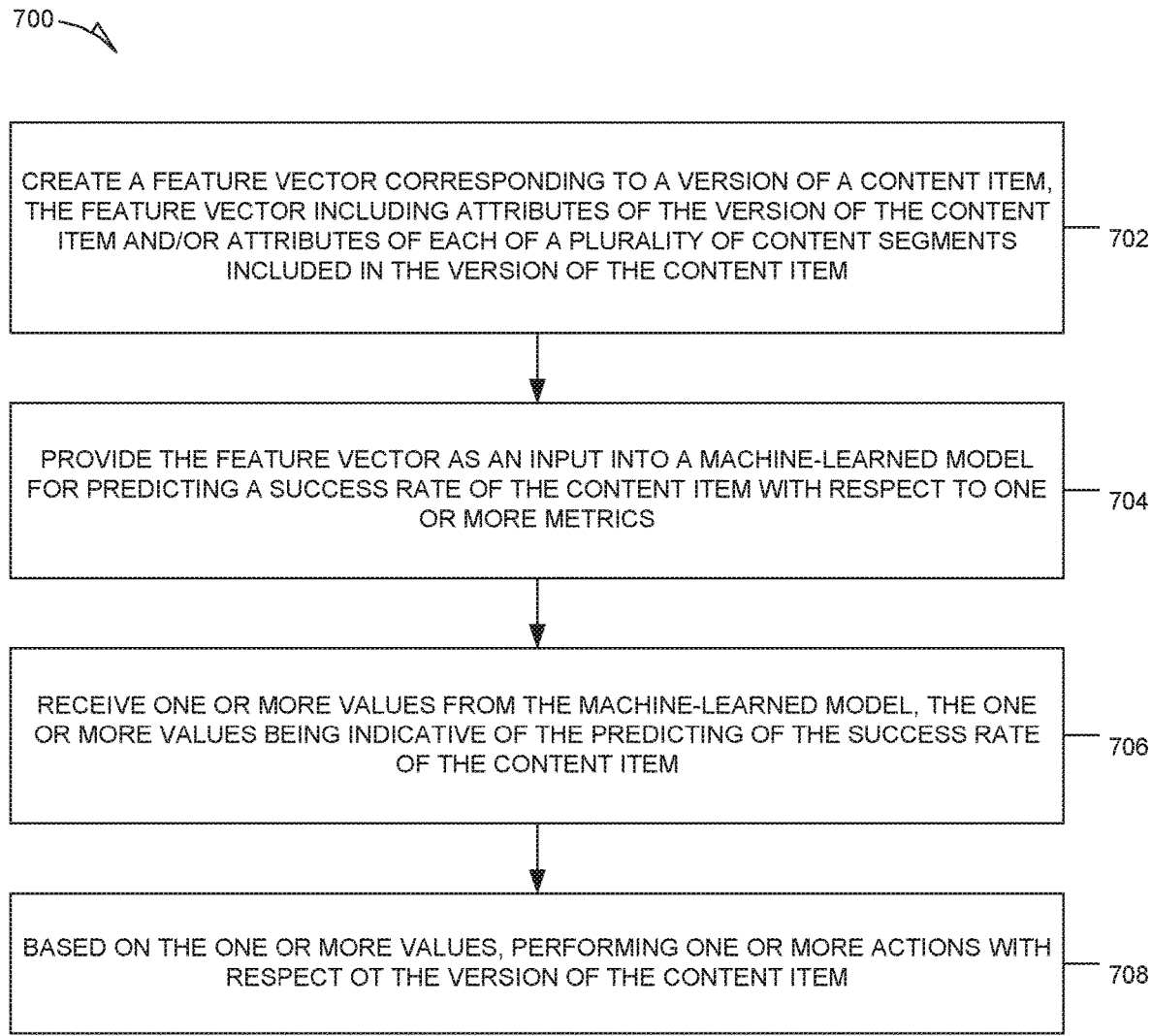
FIG. 7 is a flowchart illustrating example operations of a method of applying a machine-learned model for predicting a success rate of a content item with respect to one or metrics.

FIG. 7 is a flowchart illustrating example operations of a method 700 of applying a machine-learned model for predicting a success rate of a content item with respect to one or metrics. In various example embodiments, the method 700 is performed by one or more of the modules of FIG. 2.

At operation 702, a feature vector is created that corresponds to a version of a content item. The feature vector may include values of one or more attributes corresponding to each of a plurality of content segments included in the content item. The feature vector may also include values of one or more attributes corresponding to the version of the content item as a whole.

At operation 704, the feature vector is provided as an input into a machine-learned model. In various example embodiments, the machine-learned model was previously trained using a data set that includes feature vectors corresponding to other versions of a plurality of versions of the content item and the success rates of the other versions with respect to the one or more metrics.

At operation 706, one or more values are received as output from the machine-learned model. The one or more values are indicative of a predicted success rate of the content item with respect to the one or more metrics.

At operation 708, based on the one or more values, one or more actions are performed with respect to the version of the content item, as discussed above. For example, the version of the content item may be assigned a weighting (e.g., as metadata or a value of an attribute associated with the content item), which may, for example, serve as a basis for ranking the version among at least a subset of the plurality of versions of the content item. As another example, the version of the content item may be discarded from further processing (e.g., based on the predicted success rate falling below a minimum success rate threshold).

Figure 8:
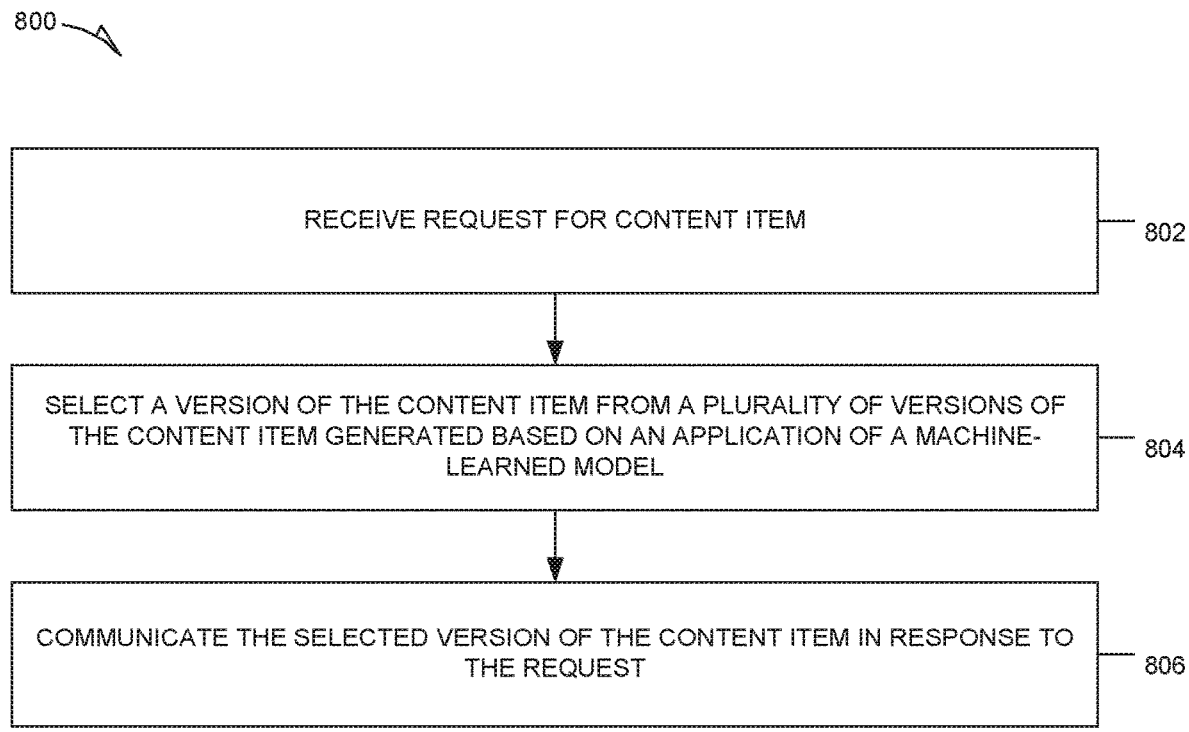
FIG. 8 is a flowchart illustrating example operations of a method of applying a machine-learned model for predicting a success rate of a content item with respect to one or metrics.

FIG. 8 is a flowchart illustrating example operations of a method 800 of applying a machine-learned model for predicting a success rate of a content item with respect to one or metrics. In various example embodiments, the method 800 is performed by one or more of the modules of FIG. 2.

At operation 802, a request for a content item is received.

At operation 804, a version of the content item is selected from a plurality of versions of the content item generated based on an application of a machine-learned model. In various example embodiments, the machine-learned model is trained using a training data set of one or more of information pertaining to a user and success rates of each of the plurality of versions with respect to one or more metrics.

At operation 806, the selected version of the content item is communicated in response to the request.

FIG. 9A is an example representation 900 of an original content segment corresponding to a content item. For example, suppose the content item is a 2-minute video in which each content item follows the protocol described herein for creating seamless transitions. The video is sliced into eight distinct content segments (or scenes), labeled C1-C8, through manual processes, automated processes, or a combination of both. Suppose that clip #1 is the intro, clips #2-7 are in the core content of the video, and clip #8 is the ending. During production, the three variations were created for clip #4, so there are 10 clips in total. Prior to loading the clips into the video optimization system, the clips may be sent to a video postproduction expert, who may add background music, color grading, etc.

Once the clips are ready for production, the clips are sent to the video optimization system. The video optimization system assigns attributes to each clip within the program's user interface (e.g., in metadata), labeled M1-M8. Clip #1 is marked as the beginning script. It is assigned a number such as position 1, or a timestamp such as 00:00, for example. Clips #2 and #3 are assigned positions 2 and 3, or timestamps, such as 00:10 and 00:15 for example. Clip #4 (which has three different versions) is assigned position 3, or 00:15 for example, and so on. Next, the video optimization system may add additional attributes to each clip. Clip #1 is the only introduction clip available, so it may not be removed. An attribute "Not removable" is assigned. The ending of clip #1 may be compatible with the beginning of clips #2, #3, and #5 for example, so an attribute such as "Allow clips to follow: 2, 3, 5" may be added, for example. Clip #2 may be compatible with clips #3, #5, and #6, and so the attribute "Allow clips to follow: 3, 5, 6" may be assigned to clip #2, and so on, and so forth. Clip #5 might not be interchangeable or removable, so "Not interchangeable, not removable" attributes might be assigned to clip #5, just for example. Clip #7 may be removable, as clip #8 (the ending) may be compatible with any preceding clip, for example, so clip 47 may have the attribute "Removable" assigned to it. The entire production may have a maximum and minimum duration attribute, such as "Minimum length: 01:30, Maximum length: 02:25" for example, which may be stored in global metadata associated with the video, labeled M0-0. After the video optimization settings have been saved into a file storage system on a server (such as a database, text file, etc.), the video is ready to go live.

In example embodiments, there are three ways in which the video may go live. Various versions of the video may be produced as static video files and may be hosted separately, one or a small number of videos may be produced at a time, or full videos may be hosted and comprised of several small videos (clips), and when played back, will seem like a seamless video to the viewer. The hosting and optimization options may depend on the complexity of the video production.

For example, in the simple 2-minute video depicted in FIG. 9A, there are Clips #1, 5, and 8 may not be removed or changed, and clips #2, 3, 4, 6, and 7 may be altered, and there are three variations for clip #4. Clip #1 could be preceded by clips #2, 3, and 5. Clip #2 was compatible with clips #3, and 5. Clip #5 was not interchangeable or removable. Clip #7 was removable. Therefore, there may be at least 5^3=125 possible variations for the 2-minute video.

FIG. 9B is an example representation 920 of one of the plurality of possible versions of the content item depicted in FIG. 9A. Here, global metadata for the version of the content item is labeled M0-1. As depicted, one of the alternative versions of the fourth video clip, C4-2, has been used in place of the original version, along with its corresponding metadata M4-2. Additionally, all of the removable clips have been removed, leaving only the non-removeable clips C1, C5, and C8, in addition to C4-2.

FIG. 9C is an example representation 940 of an additional one of the plurality of possible versions of the content item depicted in FIG. 9A. Here, global metadata for the additional version of the content item is labeled M0-2. As depicted, one of the alternative versions of the fourth video clip, C4-3, has been used in place of the original version, along with its corresponding metadata M4-3. In all other respects, except for the global metadata the additional one of the possible versions is the same as the original version.

Example Mobile Device

Figure 10:
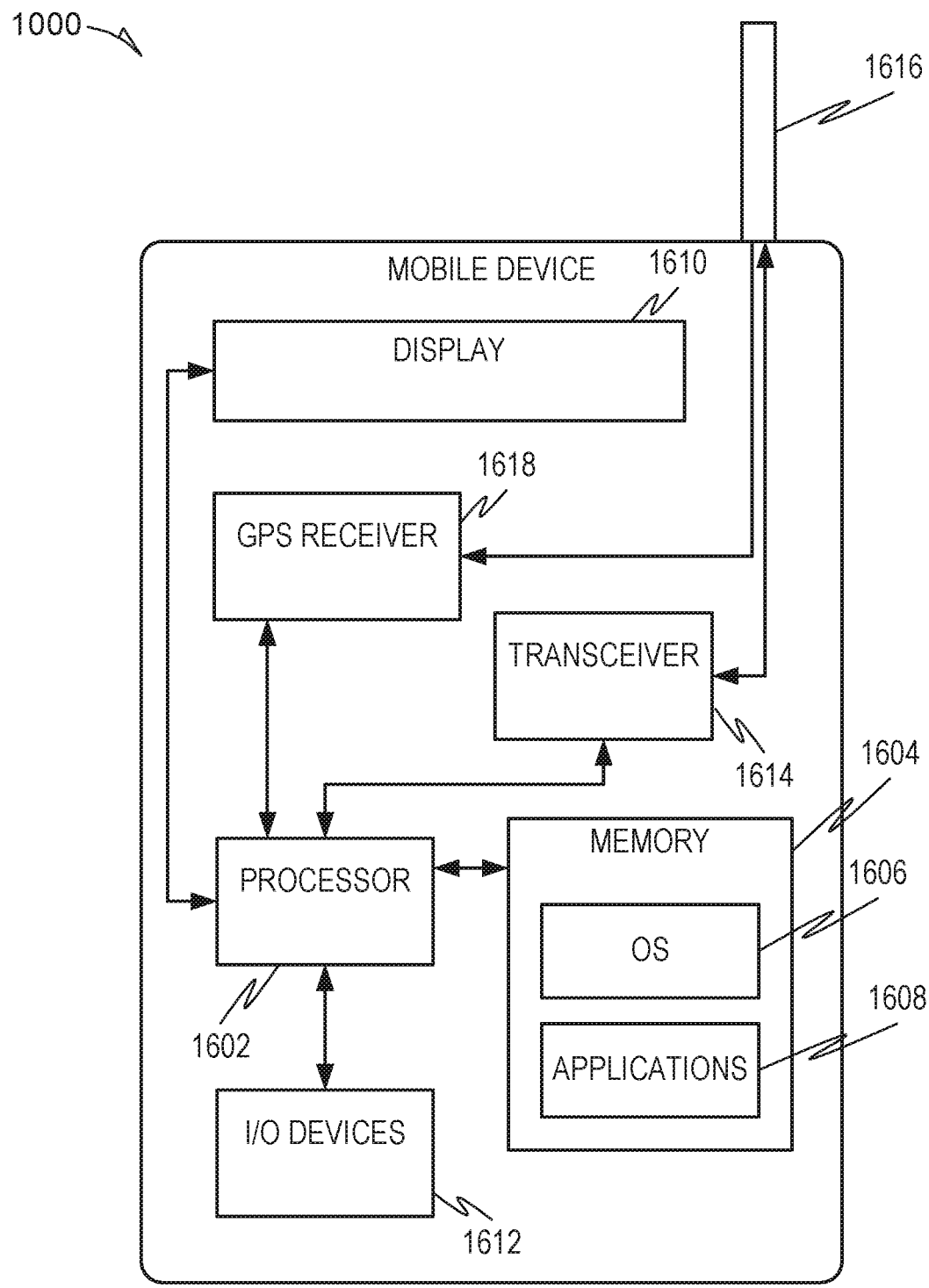
FIG. 10 is a block diagram illustrating a mobile device, according to an example embodiment.

FIG. 10 is a block diagram illustrating a mobile device 1000, according to an example embodiment. The mobile device 1000 can include a processor 1602. The processor 1602 can be any of a variety of different types of commercially available processors suitable for mobile devices 1000 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1000. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In various example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations, A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 11:
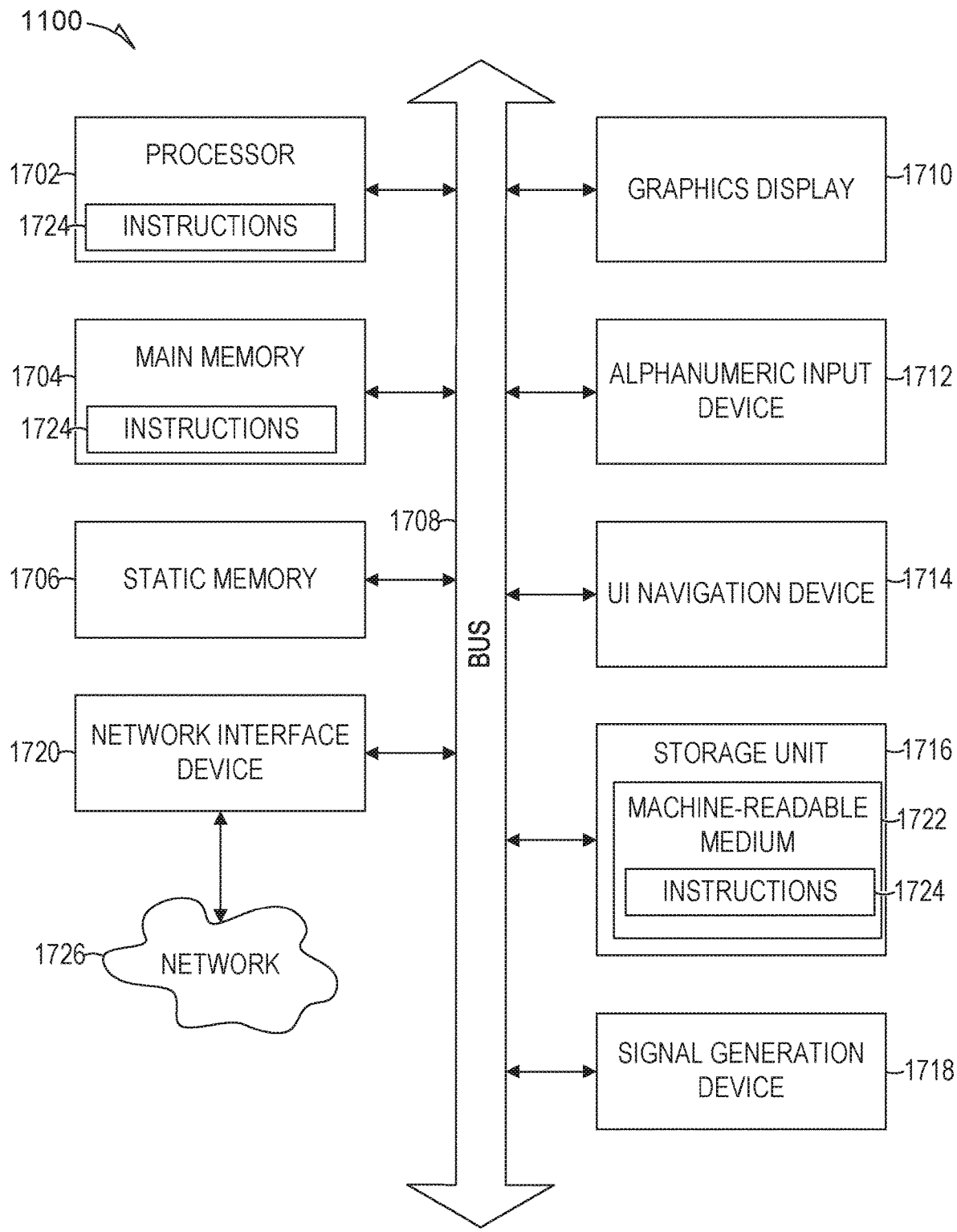
FIG. 11 is a block diagram of machine in the example form of a computer system within which instructions for causing the machine to perform any one or more of the methodologies discussed herein may be executed.

FIG. 11 is a block diagram of an example computer system 1100 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1702 (e.g., a central processing unit (CPU), a graphics processing unit (GPU) or both), a main memory 1704 and a static memory 1706, which communicate with each other via a bus 1708. The computer system 1100 may further include a graphics display unit 1710 (e.g., a liquid crystal display (LCD) or a cathode ray tube (CRT)). The computer system 1100 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.
Machine-Readable Medium The storage unit 1716 includes a machine-readable medium 1722 on which is stored one or more sets of instructions and data structures (e.g., software) 1724 embodying or utilized by any one or more of the methodologies, operations, or functions described herein. The instructions 1724 may also reside, completely or at least partially, within the main memory 1704 and/or within the processor 1702 during execution thereof by the computer system 1100, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.
Transmission Medium The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments, Combinations of the above embodiments, and other embodiments not specifically described herein, will be apparent to those of skill in the art upon reviewing the above description.

What is claimed is:
1. A method comprising:
receiving a request for a content item from a user device;
identifying a plurality of content segments associated with the content item;
associating metadata with each of the plurality of content segments, the metadata including interchangeability and severability attributes;
generating a plurality of versions of the content item, each version comprising a different combination of the plurality of content segments by interchanging or removing one or more of the plurality of content segments based on the metadata, the plurality of versions selected based on a constraint pertaining to use of computing resources and a prioritization of the plurality of versions by a machine-learning model trained to predict success rates of each of the plurality of versions with respect to one or more metrics;
monitoring user behavior data and the one or more metrics associated with each version;
selecting an updated version of the content item based on the monitored user behavior data and the one or more metrics, the selecting based on the prioritization of the plurality of versions; and
providing the updated version of the content item to the user device in response to the request.

2. The method of claim 1, wherein the plurality of content segments comprises video clips.

3. The method of claim 1, wherein the metadata further includes original timestamp data.

4. The method of claim 1, wherein generating the plurality of versions of the content item comprises applying one or more constraints relating to a minimum or maximum length of each version.

5. The method of claim 1, wherein the user behavior data comprises at least one of scrubbing backward or forward in a timeline associated with the content item, providing a rating, providing comments, or dropping off from the content item.

6. The method of claim 1, wherein the one or more metrics comprise at least one of click-through rate, watch time, audience retention, or number of interactions.

7. A system comprising:
one or more computer processors;
one or more computer memories;
a set of instructions stored in the one or more computer memories, the instructions configuring the one or more computer processors to perform operations, the operations comprising:
receiving a request for a content item from a user device;
identifying a plurality of content segments associated with the content item;
associating metadata with each of the plurality of content segments, the metadata including interchangeability and severability attributes;
generating a plurality of versions of the content item, each version comprising a different combination of the plurality of content segments by interchanging or removing one or more of the plurality of content segments based on the metadata, the plurality of versions selected based on a constraint pertaining to use of computing resources and a prioritization of the plurality of versions by a machine-learning model trained to predict success rates of each of the plurality of versions with respect to one or more metrics;
monitoring user behavior data and the one or more metrics associated with each version;
selecting an updated version of the content item based on the monitored user behavior data and the one or more metrics, the selecting based on the prioritization of the plurality of versions; and
providing the updated version of the content item to the user device in response to the request.

8. The system of claim 7, wherein the plurality of content segments comprises video clips.

9. The system of claim 7, wherein the metadata further includes original timestamp data.

10. The system of claim 7, wherein generating the plurality of versions of the content item comprises applying one or more constraints relating to a minimum or maximum length of each version.

11. The system of claim 7, wherein the user behavior data comprises at least one of scrubbing backward or forward in a timeline associated with the content item, providing a rating, providing comments, or dropping off from the content item.

12. The system of claim 7, wherein the one or more metrics comprise at least one of click-through rate, watch time, audience retention, or number of interactions.

13. A non-transitory computer-readable storage medium storing a set of instructions that, when executed by one or more computer processors, causes the one or more computer processors to perform operations, the operations comprising:
receiving a request for a content item from a user device;
identifying a plurality of content segments associated with the content item;
associating metadata with each of the plurality of content segments, the metadata including interchangeability and severability attributes;
generating a plurality of versions of the content item, each version comprising a different combination of the plurality of content segments by interchanging or removing one or more of the plurality of content segments based on the metadata, the plurality of versions selected based on a constraint pertaining to use of computing resources and a prioritization of the plurality of versions by a machine-learning model trained to predict success rates of each of the plurality of versions with respect to one or more metrics;
monitoring user behavior data and the one or more metrics associated with each version;
selecting an updated version of the content item based on the monitored user behavior data and the one or more metrics, the selecting based on the prioritization of the plurality of versions; and
providing the updated version of the content item to the user device in response to the request.

14. The non-transitory computer-readable storage medium of claim 13, wherein the plurality of content segments comprises video clips.

15. The non-transitory computer-readable storage medium of claim 13, wherein the metadata further includes original timestamp data.

16. The non-transitory computer-readable storage medium of claim 13, wherein generating the plurality of versions of the content item comprises applying one or more constraints relating to a minimum or maximum length of each version.

17. The non-transitory computer-readable storage medium of claim 13, wherein the user behavior data comprises at least one of scrubbing backward or forward in a timeline associated with the content item, providing a rating, providing comments, or dropping off from the content item.

18. The non-transitory computer-readable storage medium of claim 13, wherein the one or more metrics comprise at least one of click-through rate, watch time, audience retention, or number of interactions.

* * * * *